April 27, 1954   H. WALTHER   2,676,499
METHOD OF PRODUCING ACCURATELY SIZED LONG BORES
Filed Dec. 29, 1952
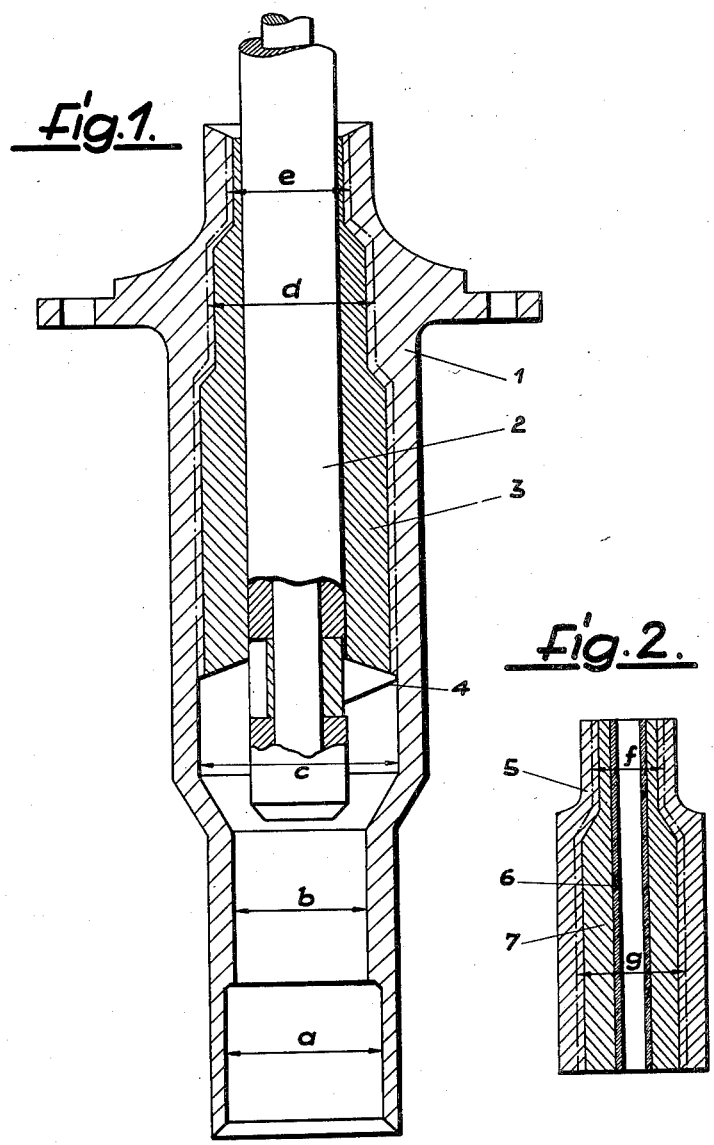
Inventor
Hanns Walther
By
Young, Emery & Thompson
Attys.

Patented Apr. 27, 1954

2,676,499

UNITED STATES PATENT OFFICE 2,676,499

METHOD OF PRODUCING ACCURATELY SIZED LONG BORES

Hanns Walther, Wasseralfingen (Wurttemberg), Germany, assignor to Nabenfabrik Alfing Kessler, Kommanditgesellschaft, Wasseralfingen, Germany Application December 29, 1952, Serial No. 328,345

Claims priority, application Great Britain December 31, 1951

6 Claims. (Cl. 77—1)

The present invention relates to a method of producing accurately sized long bores, that is to say bores the dimensions of which agree precisely with the prescribed diameter.

Long bores are today produced generally on boring machines wherein a boring bar, provided with cutters and supported on both sides of the workpiece, is rotated within the workpiece and is moved relatively thereto in the direction of the boring axis. It is relatively simple to produce in this way an accurately sized bore with constant diameter for a certain length, if the stiffness of the boring bar is large in comparison with the cross section of the chips produced during boring as is the case in relatively large bore diameters. It is more difficult to produce an accurate long bore of smaller diameter in which the stability of the boring rod is no longer sufficient to produce an exact bore. In such cases only reamers could be used heretofore, which are supported in the bore itself. Thereby however only cylindrical bores can be produced which are accurate only with rotating workpieces. If the bore differs from the cylindrical form it is only possible to operate with the aforesaid boring bars which for this purpose must be provided with cutters adjustable from the outside. This requires that the boring bar is reduced in section and thereby in stiffness by the adjustment mechanism located within it, so that accurate boring is not possible.

It is the object of the invention to avoid the said difficulties. The method according to the invention for producing an accurately sized long bore in a workpiece by means of a boring bar provided with at least one cutter comprises the following steps: Producing at first a rough bore, the diameter of which is between that of the final bore and that of the boring bar to be used, preferably a rough bore the diameter of which approaches the diameter of the final bore, then coating said rough bore with a coatable filling material being adapted, after having solidified, to be worked by chip-forming cutting operations, producing in the filling material at least before solidifying thereof, a bore of the diameter of the boring bar, and subsequently effecting the final boring by guiding the boring bar in the bore having the diameter of the boring bar and by cutting, according to the movement of the cutter in axial direction, the filling material and the workpiece to obtain the prescribed accurate diameter within the bore of the workpiece.

By using this method the boring bar is guided at every stage of the boring directly adjacent to the cutting tool.

The diameter of the rough bore is conveniently so chosen, as to be nearly equal to the final diameter. This rough bore need not be produced by boring. It can, for example, be formed in the case of a casting during the casting operation by using a core piece having the diameter of the rough bore.

A particular advantage of the method according to the invention is that the rough bore need not be concentric with the final bore. The rough bore can be eccentric or inclined to the final bore and its axis need not lie in one straight line. It is only essential that the bore of the filling is concentric with the final bore.

The final bore of a workpiece can be composed of several parts of various diameters in the axial direction. Conveniently the rough bore is in this case composed of parts of various diameters in order that the cutting tool is not overloaded. The bore of the filling is however also in this case the same throughout its whole length.

A filling material is used which is introduced in the liquid or plastic state in the rough bore and then hardened. The filling must embody satisfactory properties, in the case of casting so that it can be easily cast into position and hardened in a short time without shrinkage but shall be easily worked by chip forming operations i. e. with a cutting tool in order that an excessive loading of the cutting edge of the tool shall be avoided.

As the filling material, an artificial material, especially an artificial resinous product can be used for example a thermo-plastic resin (polyvinyl), a thermo-setting resin (phenolic resin) or an artificial hornlike material having a casein base. It is also possible to use a lead alloy or any other material which comprises the necessary properties.

The filling can also be divided and a tube with an accurate bore which corresponds to the diameter of the boring bar can be inserted and the space between the tube and the rough bore filled with a filling material which is capable of hardening. In this case there results using a core of the diameter of the boring rod, insofar as the gauge for producing the accurate bore of the tube represents the core utilized.

When using a tube naturally only the tube need have the desired bearing properties.

The operation of the method according to the invention will be further explained with reference to the accompanying drawings by way of example wherein:

Fig. 1 represents the operation of the method in the case where the boring bar is guided in a hardened filling material and Fig. 2 shows the case where the filling comprises a tube and a filling material.

As will be seen from Fig. 1 the workpiece is provided with a bore which is formed of parts of various diameters *a* to *e*. For this purpose a rough bore is first produced of about the same form as the final required bore.

The diameters of this rough bore are somewhat smaller than the diameter a to e respectively. This rough bore is coated with a filling material 3 while using a core of the diameter of the boring bar 2, the filling material being for example cast into position.

It is possible and, if the filling material is in a liquid state, it is necessary at first to insert the core into the rough bore and then fill in the filling material. If the filling material is in a plastic state it is possible to perform the method in the same way, but in this case it is also possible to coat the rough bore with the filling material producing thereby in the filling material a bore of approximately the diameter of the core and then to insert the core and to finish the filling to obtain that the core is accurately embedded in the filling material.

After the filling material has hardened the core is removed, the boring bar is introduced into the bore and the final bore obtained by guiding the boring bar in the bore of the filling material having the diameter of the boring bar and by cutting, according to the movement of the cutter in axial direction, the filling material and the workpiece. In the example shown the boring bar 2 carries an adjustable cutter. It will be seen from the drawing (Fig. 1) that the boring bar 2 is guided by the filling material 3 immediately adjacent to the cutter 4.

Fig. 2 shows in simplified form a workpiece 5 in which a bore is to be produced parts of which are to have the diameters f and g. It is here shown that the filling comprises a tube 6 which is of accurate bore according to the diameter of the boring bar (not shown). The filling material 7 fills the space between the tube 6 and the rough bore.

Inserting the tube 6 into the rough bore and filling in the filling material 7 may be performed in the same manner as explained in combination with Figure 1. After the filling material 7 has hardened the boring bar (not shown in Fig. 2) is introduced into the bore of the tube 6, and the final bore is obtained by guiding the boring bar in the tube and by cutting, according to the movement of the cutter in axial direction, the tube, the filling material and the workpiece.

What I claim is:

1. A method for producing an accurately sized long bore in a workpiece by means of a boring bar provided with at least one cutter, comprising producing at first a rough bore, the diameter of which is between that of the final bore and that of the boring bar to be used, preferably a rough bore the diameter of which approaches the diameter of the final bore, then coating said rough bore with a coatable filling material being adapted, after having solidified, to be worked by chip-forming cutting operations, producing in the filling material, at least before solidifying thereof, a bore of the diameter of the boring bar, and subsequently effecting the final boring by guiding the boring bar in the bore having the diameter of the boring bar and by cutting, according to the movement of the cutter in axial direction, the filling material and the workpiece to obtain the prescribed accurate diameter within the bore of the workpiece.

2. A method according to claim 1, wherein a core having the accurate diameter of the boring bar is used to produce in the filling material a bore of the diameter of the boring bar.

3. A method for producing an accurately sized long bore in a workpiece by means of a boring bar provided with at least one cutter, comprising producing at first a rough bore, the diameter of which is between that of the final bore and that of the boring bar to be used, preferably a rough bore the diameter of which approaches the diameter of the final bore, then coating said rough bore with a coatable filling material being adapted, after having solidified, to be worked by chip-forming cutting operations, producing in the filling material, at least before solidifying thereof, a bore of the diameter of the boring bar by inserting a tube of accurate bore corresponding to the diameter of the boring bar, and subsequently effecting the final boring by guiding the boring bar in the tube and by cutting, according to the movement of the cutter in axial direction, the tube, the filling material and the workpiece to obtain the prescribed accurate diameter within the bore of the workpiece.

4. A method, for producing an accurately sized long bore having different diameters along its length in a workpiece by means of a boring bar provided with at least one cutter, comprising producing at first a rough bore, the diameters of which are between those of the final bore respectively and that of the boring bar to be used, preferably a rough bore the diameters of which approach the diameters of the final bore, respectively then coating said rough bore with a coatable filling material being adapted, after having solidified, to be worked by chip-forming cutting operations, producing in the filling material, at least before solidifying thereof, a bore of the diameter of the boring bar, and subsequently effecting the final boring having different diameters by guiding the boring bar in the bore having the diameter of the boring bar and by cutting, according to the movement of the cutter in axial direction, the filling material and the workpiece to obtain the prescribed accurate diameters within the bore of the workpiece.

5. A method for producing an accurately sized long bore having different diameters along its length in a workpiece by means of a boring bar provided with at least one cutter, comprising producing at first a rough bore, the diameters of which are between those of the final bore respectively and that of the boring bar to be used, preferably a rough bore the diameters of which approach the diameters of the final bore respectively, then coating said rough bore with a coatable filling material being adapted, after having solidified, to be worked by chip-forming cutting operations, producing in the filling material, at least before solidifying thereof, a bore of the diameter of the boring bar by inserting a tube of accurate bore corresponding to the diameter of the boring bar, and subsequently effecting the final boring having different diameters by guiding the boring bar in the tube and by cutting, according to the movement of the cutter in axial direction, the tube, the filling material and the workpiece to obtain the prescribed accurate diameters within the bore of the workpiece.

6. A method according to claim 1, wherein a filling material is used selected from the group of coatable and hardenable filling materials adapted, when hardened, to be worked by chip-forming cutting operations, this group consisting of thermoplastic artificial material, thermo-setting artificial material, thermoplastic synthetic resin, thermo-setting synthetic resin, artificial horn-like substance having a casein base, or a lead alloy.

No references cited.